INVENTOR.
HARRY COMER WOLF
BY Harry Lea Dodson
ATTORNEY.

April 26, 1938.   H. C. WOLF   2,115,379
APPARATUS FOR SECONDARY RECOVERY FROM OIL WELLS
Filed Feb. 2, 1937   4 Sheets-Sheet 4

INVENTOR.
HARRY COMER WOLF
BY Harry Lea Dodson
ATTORNEY.

Patented Apr. 26, 1938

2,115,379

UNITED STATES PATENT OFFICE 2,115,379

APPARATUS FOR SECONDARY RECOVERY FROM OIL WELLS

Harry Comer Wolf, Irvine, Ky., assignor to Arnold R. Hanson and S. Willner Hanson, trustees Application February 2, 1937, Serial No. 123,597

7 Claims. (Cl. 166—1)

My invention relates to the apparatus described in my co-pending application Serial No. 82,829, filed June 1, 1936, of which this is a continuation in part.

That application describes the apparatus to be used in order to increase and maintain the permeability of oil sands so as to permit the secondary recovery of oil from an abandoned field or to increase the profitable operation of any oil lease by reason of the provision of means to regulate and stabilize the production and which will increase the ultimate total oil recovered from a given structure containing oil.

It is well known that only from eight to thirty per centum of the oil in the producing horizon is recoverable by the ordinary methods. Many plans have been conceived and tried to increase the percentage of recovery but without any material success. The principal one is to subject the oil rock or sand to an artificial pressure but practice has shown that it is admittedly a failure and has been discarded in most fields. In my experience of many years actual work in the field, I have discovered that if you select a lease where the abandoned wells were drilled on what is commonly termed the five-spot plan or if a new field is to be drilled the wells are drilled on that plan, that if the center well of every group of five wells is connected to the discharge side of a suitable compressor, and then the adjoining wells of the group are connected to a suitable vacuum pump, by then arranging suitable valve connections so that the pressure wells can be instantly converted into vacuum wells and the vacuum wells into pressure wells and the conversion caused to be instantaneous that there will be a marked increase in the out-put of the wells. I have also found in practice that this is not effective unless the wells so connected are in comparatively close groups. Such a method as is set forth in the patent to Waitz, No. 1,295,243, for instance, is not satisfactory for the reason that the beneficial effect would diminish about as the square of the distance from his operating well approaches the corners or farther edges of the lease.

I have also found in practice that in order to be able to simultaneously pump the well which is being employed as a repressuring well and the vacuum or producing wells, that it is necessary to first determine the critical pressure by which to establish the static balance between the permeability of the sands and the viscosity of the oil.

My invention has for its object to produce apparatus which when attached to groups of wells will materially increase the permeability of the oil rock or sand and will maintain it, thereby greatly increasing the out-put of a given field.

My invention has for its further object to provide means for determining the critical pressure above referred to.

In the accompanying drawings which are hereunto annexed and made a part of this specification I have illustrated more or less diagrammatically my means for so connecting the wells.

My means of accomplishing the foregoing objects may be more fully comprehended by having reference to the accompanying drawings, which are hereunto annexed and are a part of this specification, in which.

Similar reference numerals refer to similar parts throughout the entire specification.

Figure 1:
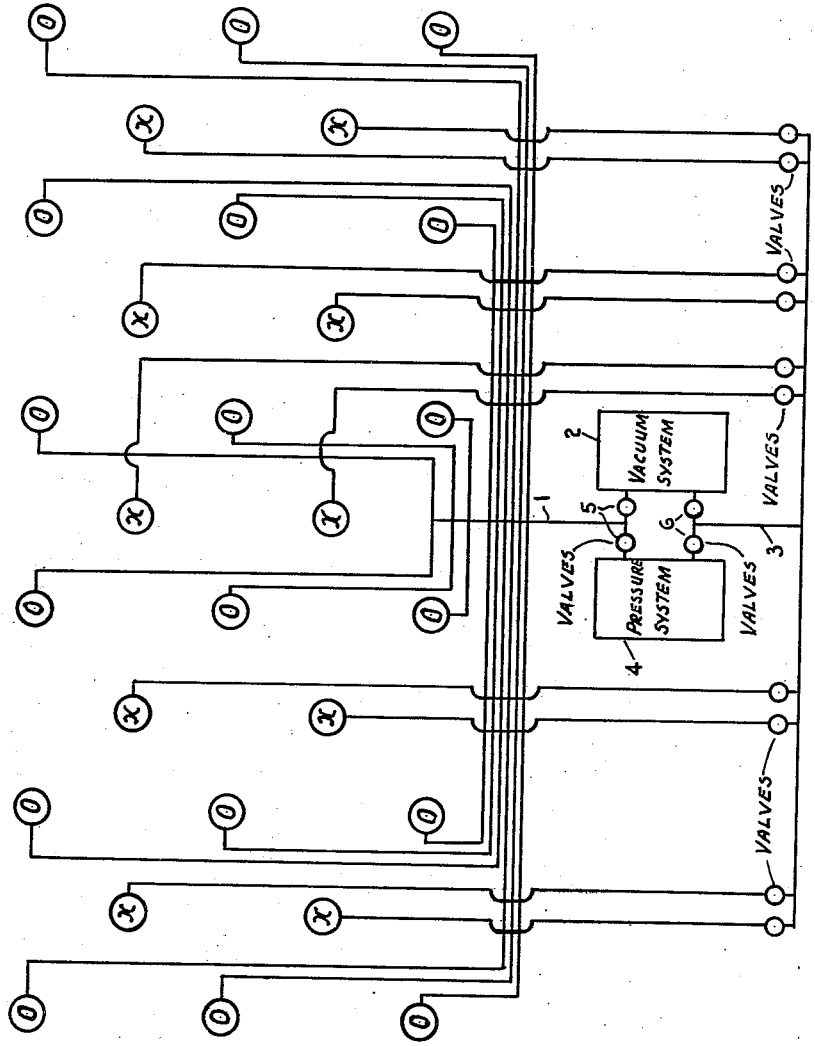
Fig. 1 is a graph of a typical oil lease equipped with my apparatus.
Figure 2:
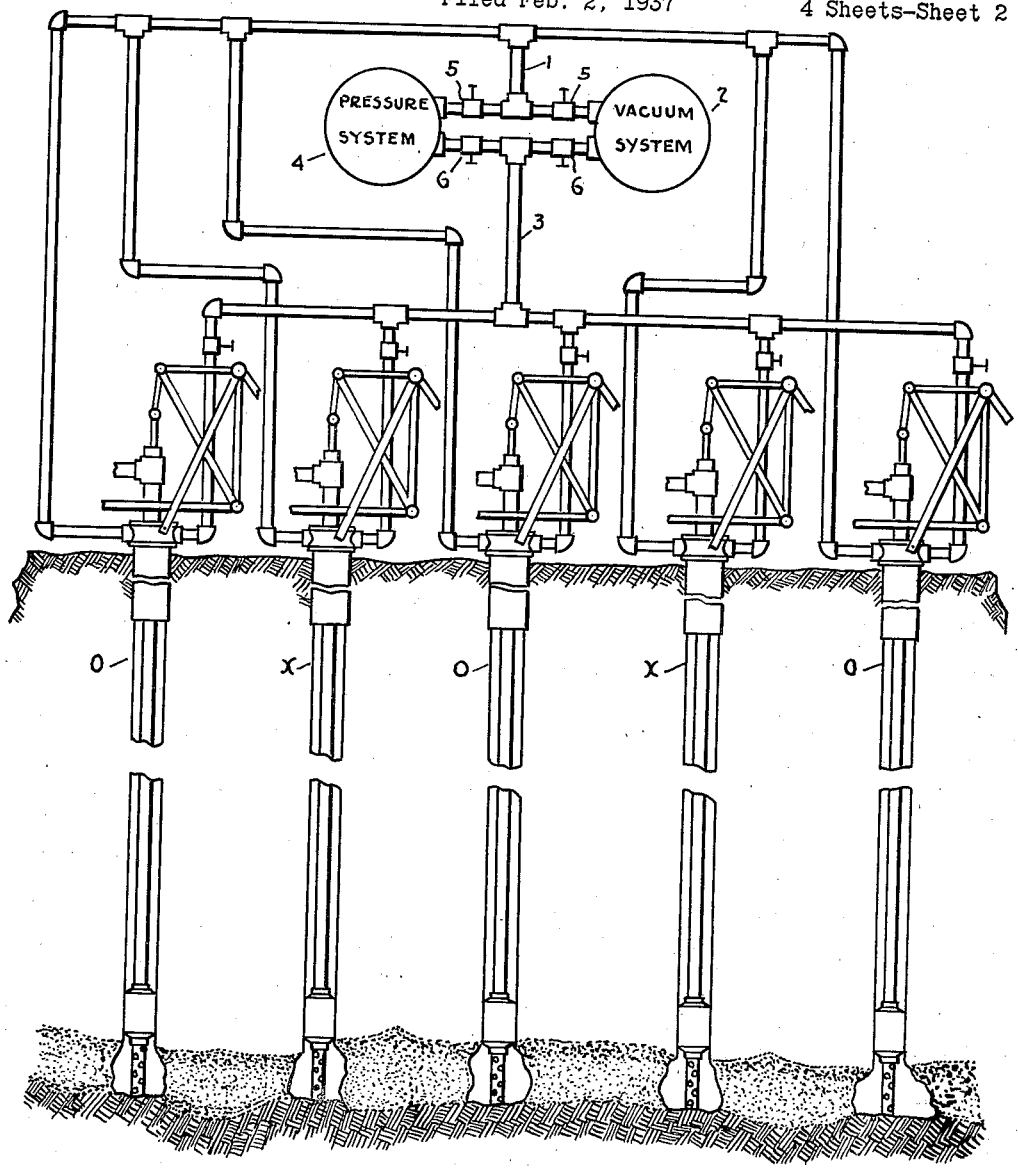
Fig. 2 is a view of a group of wells showing the pump jacks, and cylinders, casings with their connections to the compressor and vacuum pump, and a diagrammatic section of the rock and sand.
Figure 3:
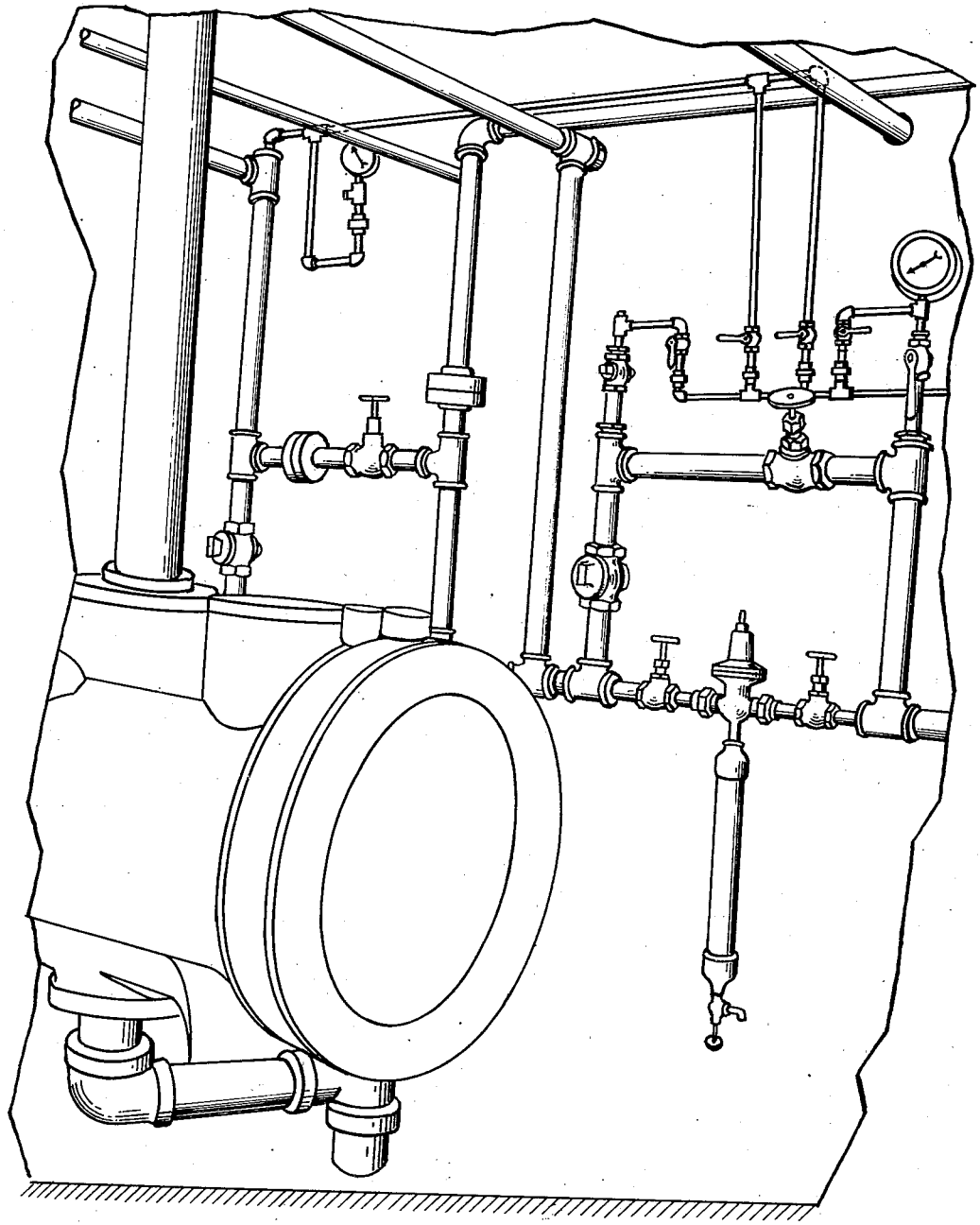
Fig. 3 is a fragmentary perspective view on enlarged scale showing the control manifolds.
Figure 4:
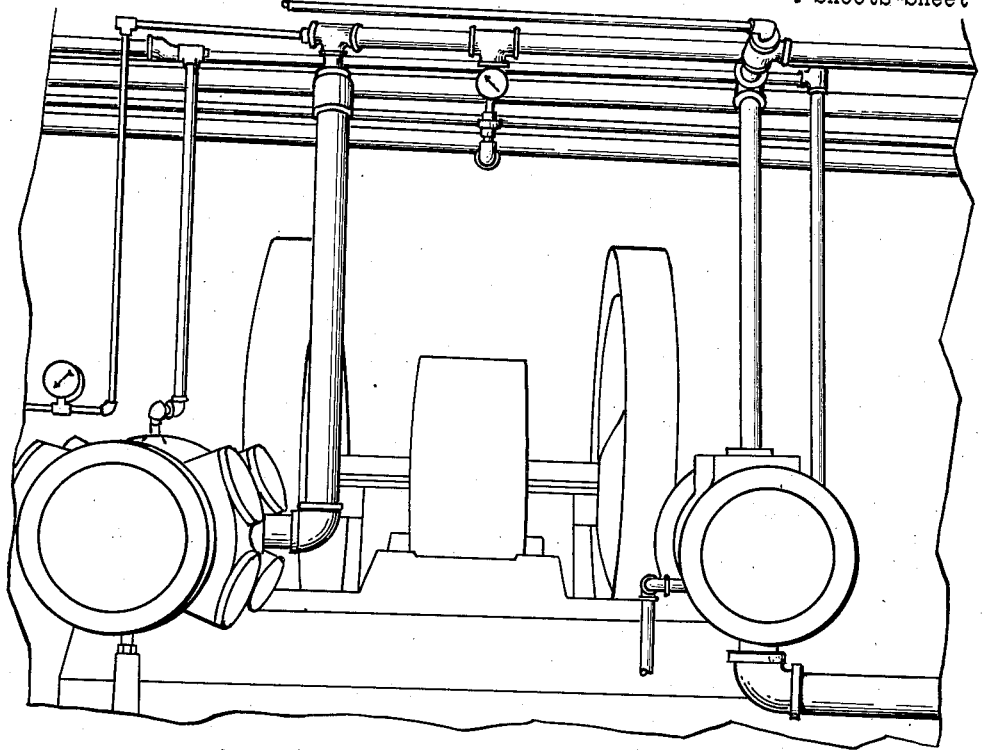
Fig. 4 is a fragmentary perspective view looking toward the compressor.
Figure 5:
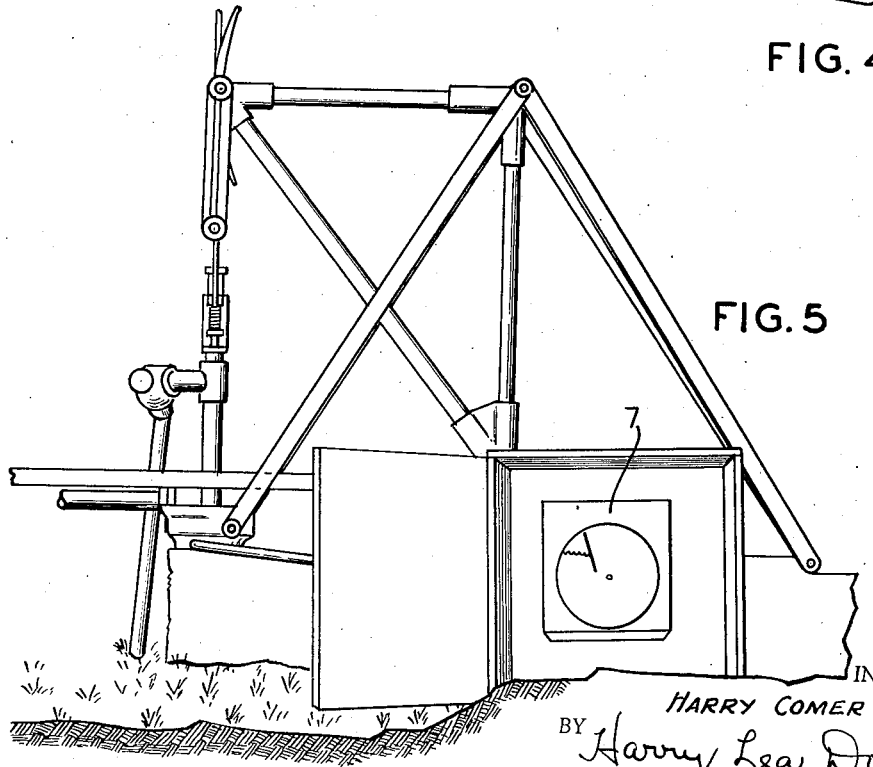
Fig. 5 is a perspective view of a pump jack and bridle, connected to the shackle rods, and a recording pressure gauge.

As shown in the drawings, the intake or pressure wells are indicated as "X" and the vacuum wells are indicated as "O". I connect each well "O" to a centrally located manifold or a common line 1, as shown on the drawings, of each group of wells common to a common line, common to each group of wells "X" and "O". I connect a vacuum pump 2 of suitable dimensions and suitable powered to the common line or manifold 3 to which the "X" or pressure wells are connected and connect the discharge of a suitable compressor or pump 4 to the common line or manifold 1 to which the "O" wells are connected.

In operation I can then suddenly or instantly change the "X" wells to the pump and the "O" wells to the vacuum, by simply changing the valves 5 and 6 at a centrally located control point, without going to each well to effect such change. In doing this, I find in practice that the sudden reversal of the direction of flow of the oil in the structure, due to the combination of reduced pressure in the producing "O" wells, and the pressure applied to the oil in the structure through the intake "X" wells, results in a cleaning out of the pores of the producing structure. I also find in practice, that instead of producing only from the "O" wells I can simultaneously and at periodic intervals produce from the "X" wells, if the static balance between the permeability of the sand and the viscosity of the oil, is first determined. This I accomplish by providing a pressure gauge 7 which is so connected as to give a record of the pressure on the well. In some instances, it requires tremendous volume before pressure begins to build up on a well. In other instances, pressure will build up in a few minutes. After determining this time-volume factor by frequent gauge tests over a period of hours or days, as may be necessary, I find in practice that I can then set the regulators proportionately, or in general, I have observed that the greater the amount of time taken to build up pressure in a well, the higher is the critical pressure for the establishment of the required static balance.

The foregoing is not common practice; on the contrary, it is common practice to use installations that result only in production from the "O" wells, thereby losing much production that I find in practice with my method, can be obtained from wells ordinarily restricted from production by reason of their use as pressure or intake wells.

It will be obvious to persons skilled in the art that many changes in the specific type of apparatus employed may be made without departing from the scope of my invention and I do not wish to be understood as limiting myself to any specific details except as such limitations appear in my claims.

Having described my invention what I regard as new and desire to secure by Letters Patent is:

1. In an apparatus to increase the production of oil wells a compressor, a vacuum pump, pipe connections to connect a central well of a group of five wells to the discharge side of said compressor, pipe connections to connect the other adjoining four to said vacuum pump and means to instantly change the pressure well to a vacuum and the vacuum ones to pressure and a gauge connected to the pressure well to record the pressure therein, whereby the static balance between the permeability of the sand and the viscosity of the oil may be determined.

2. In an apparatus to increase the production of oil wells a compressor, a vacuum pump, pipe connections to connect a central well of a group of five wells to the discharge side of said compressor, pipe connections to connect the other adjoining four to said vacuum pump, a manifold common to all of the pipe connections leading to the pressure wells, a manifold common to all of the pipe connections leading to the vacuum wells, means to instantly connect the pressure manifold to the vacuum pump and the vacuum manifold to the compressor, and a gauge connected to the pressure well to record the pressure therein, whereby the static balance between the permeability of the sand and the viscosity of the oil may be determined.

3. In a field of oil wells drilled on the five-spot plan, a pipe connection to connect the pressure heads of the wells in the center of each five-spot to a compressor, pipe connections to connect the adjoining wells in each five-spot to a vacuum pump, and means to instantly reverse said connectors whereby the center wells will be connected to the vacuum pump and the adjoining ones in each group to the compressor, and a gauge connected to the pressure well to record the pressure therein, whereby the static balance between the permeability of the sand and the viscosity of the oil may be determined.

4. In an apparatus to increase the production of oil wells a compressor, a vacuum pump, pipe connections to connect a central well of a group of five wells to the discharge side of said compressor, pipe connections to connect the other adjoining four to said vacuum pump a manifold common to all of the pipe connections leading to the pressure wells, a manifold common to all of the pipe connections leading to the vacuum wells, valves in said pipes the operation of which serves to connect the pressure manifold to the vacuum pump and the vacuum manifold to the compressor, and a gauge connected to the pressure well to record the pressure therein, whereby the static balance between the permeability of the sand and the viscosity of the oil may be determined.

5. In a field of oil wells drilled on the five-spot plan, a compressor, a vacuum pump, means to connect a central well of every five-spot group on the field to the discharge side of said compressor and means to connect the adjoining wells of every five-spot group to said vacuum pump and means to instantaneously reverse the pressure and vacuum in either direction, and a gauge connected to the pressure well to record the pressure therein, whereby the static balance between the permeability of the sand and the viscosity of the oil may be determined.

6. In a field of oil wells drilled on the five-spot plan, a compressor, a vacuum pump, means to connect a central well of every five-spot group on the field to the discharge side of said compressor and means to connect the adjoining wells of every five-spot group to said vacuum pump and means to instantaneously reverse the pressure and vacuum in either direction from a central location, and a gauge connected to the pressure well to record the pressure therein, whereby the static balance between the permeability of the sand and the viscosity of the oil may be determined.

7. In a field of oil wells drilled on the five-spot plan, a compressor, a vacuum pump, pipe connections to connect a central well of every five-spot group on the field to the discharge side of said compressor and pipe connections to connect the adjoining wells of every five-spot group to said vacuum pump and valves to instantaneously reverse the pressure and vacuum in either direction, and a gauge connected to the pressure well to record the pressure therein, whereby the static balance between the permeability of the sand and the viscosity of the oil may be determined.

HARRY COMER WOLF.